(12) United States Patent
Kawamura et al.

(10) Patent No.: US 6,632,559 B1
(45) Date of Patent: Oct. 14, 2003

(54) SAFETY DEVICE FOR SEALED BATTERY AND SEALED BATTERY USING IT

(75) Inventors: Hiroaki Kawamura, Yamaguchi-ken (JP); Hiroaki Okamoto, Yamaguchi-ken (JP); Kinji Saijyo, Yamaguchi-ken (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/856,047

(22) PCT Filed: Nov. 19, 1999

(86) PCT No.: PCT/JP99/06495

§ 371 (c)(1),
(2), (4) Date: May 17, 2001

(87) PCT Pub. No.: WO00/31810

PCT Pub. Date: Jun. 2, 2000

(30) Foreign Application Priority Data

Nov. 19, 1998 (JP) .......................... 10-329071

(51) Int. Cl.⁷ .............................................. H01M 2/12
(52) U.S. Cl. ......................................... 429/56; 429/61
(58) Field of Search ...................... 429/56, 61

(56) References Cited

U.S. PATENT DOCUMENTS

| | | | | |
|---|---|---|---|---|
| 5,821,008 A | * | 10/1998 | Harada et al. | 429/56 |
| 6,235,424 B1 | * | 5/2001 | Cho | 429/56 X |
| 6,242,126 B1 | * | 6/2001 | Mori et al. | 429/56 |
| 6,322,921 B1 | * | 11/2001 | Iwaizono et al. | 429/56 |
| 6,423,440 B1 | * | 7/2002 | Takada et al. | 429/56 X |

OTHER PUBLICATIONS

English translation of Japanese Kokai 09–199,105 Document published Jul. 1997.*
Yamashita Masataka; JP 5–314959, "Safety Valve Device for Battery"; Asahi Chemical Industry Co., Ltd.), Nov. 26, 1993; Par. No. [0015]. Asbtract Only.
Murakami Tetsuya et al; JP 6–333548; "Explosion–Proof Battery"; Matsushita Electric Ind. Co., Ltd.), Dec. 2, 1994; Par. Nos. [0008] to 0010. Abstract Only.
Takeuchi Yasuhiro et al; JP 9–199105; Explosion–Proof Sealing Plate for Secondary Cell; Matsushita Electric Ind. Co., Ltd.; Jul. 31, 1997; Par Nos. [0010] to [0025]; Abstract Only.

* cited by examiner

Primary Examiner—Stephen Kalafut
(74) Attorney, Agent, or Firm—Browdy and Neimark

(57) ABSTRACT

A safety device for a closed battery capable positively preventing a rupture due to a rapid internal pressure rise at over-packing and short-circuiting and being produced inexpensively, a positive electrode lid (16) attached to one end of an outer covering can (11) comprises a pressure receiving plate (18) forming the innermost lid and connected to positive electrode (13) of an electrode unit (12) via positive electrode lead (17), a shielding plate (20) forming a middle lid and electrically connected to the pressure receiving plate (18) via a center contact (19), and a sealing plate (21) forming the outermost lid and electrically connected to the shielding plate (20). The center contact (19) is formed of a projection (28) having a first flat contact surface (27) of the pressure receiving plate (18) and a second flat contact surface (29) of the shielding plate (20), and a plurality of annular grooves (31, 33) are alternately provided around the second flat contact surface (29) so as to face each other at 180° intervals, the annular grooves (31, 33) being covered with a metal foil (34) to form valve membranes (35, 36).

16 Claims, 8 Drawing Sheets

SAFETY DEVICE FOR SEALED BATTERY AND SEALED BATTERY USING IT

REFERENCE TO RELATED APPLICATIONS

The present application is the national stage under 35 U.S.C. §371 of international application PCT/JP99/06495, filed Nov. 19, 1999 which designated the United States, and which application was not published in the English language.

INDUSTRIAL FIELD

The present invention relates to a safety device to make a closed battery explosion-proof and a closed battery with the safety device.

BACKGROUND OF THE INVENTION

Recently, a lithium battery with non-water electrolytic solution and a secondary battery with non-water electrolytic solution for a lithium ion battery have been broadly employed for pocket electronic tools.

Although the secondary battery has a high electro motive force, the secondary battery would explode in case of increasing inner pressure caused by chemical reaction in an electrode member with a positive electrode and a negative electrode installed in an outer container. For example, when a non-aqueous electrolytic solution battery such as a lithium secondary battery is in an overcharge condition or a large amount of electric current is flown into the battery in a short circuit condition caused by a wrong operation, non-aqueous electrolytic solution is absorbed in the electrode member and gas is produced. When the gas is continuously produced in the outer container and the inner pressure of the outer container is increased, the battery would eventually explode.

In order to avoid such an explosion, a closed battery for pocket electronic tools was developed as shown in Japanese Patent Laid-Open Publication No. 6-338305.

In the conventional art, a positive electrode lid provided at an edge of an outer container comprises a metallic porous plate affected as the inner most lid and connected to a positive electrode of an electrode member through a positive electrode lead, a metallic explosion-proof valve affected as an intermediate lid electrically connected to the metallic porous plate through a central adhered portion and a metallic cap terminal electrically connected to the metallic explosion-proof valve.

Under the structure as described above, when the inner pressure of the battery is increased, the metallic porous plate and the metallic explosion-proof plate are electrically isolated by breaking the central adhered portion and gas produced in the inside of the battery is discharged by breaking a part of the metallic explosion-proof valve so as to avoid an explosion of the battery.

However, in a conventional closed battery, some drawbacks remain. Although a central adhered portion is formed by welding a central portion of a metallic porous plate and a metallic explosion-proof valve by spot welding, it is difficult to weld all the portions uniformly by spot welding and a welding strength of each closed battery is not constant. As the result, the inner pressure of a battery for isolating a communication between the metallic porous plate and the metallic explosion-proof plate is not constant. In the case of a closed battery, although the inner pressure of the battery rises to a predetermined isolation pressure, a communication between the metallic porous plate and the metallic explosion-proof can not be isolated. Thus, a reliability of a closed battery is damaged in view of safety.

In order to solve the above problems, a purpose of the present invention is to provide a safety device of a closed battery in which a pressure plate and a shield plate can be isolated certainly and the safety of the closed battery can be maintained sufficiently even if the inner pressure of the battery exceeds a predetermined level, and a closed battery with the safety device.

DISCLOSURE OF THE INVENTION

To accomplish the above purpose, a safety device of a closed battery as claimed in claim 1 comprises a positive electrode lid attached at one end of an outer container, the positive electrode lid including a pressure plate effected as the innermost lid and electrically connected to a positive electrode of an electrode member through a positive electrode lead, a shield plate effected as an intermediate lid and electrically connected to the pressure plate through a central contacting portion, and a sealing plate affected as the outermost lid and electrically connected to the shield lid wherein at least one gas flow hole is provided at the pressure plate so as to communicate the internal space of the outer container with a contacting space between the pressure plate and the shield plate. A central contacting portion includes a protrusion which protrudes from a-central portion of the pressure plate toward the shield plate and having a first flat contacting surface and a second contacting surface provided at the central portion of the shield plate and contacting with the first flat contacting surface of the protrusion. The pressure plate and the shield plate are isolated when the inner pressure level of the outer container exceeds a predetermined electric current isolation pressure.

A safety device as claimed in claim 2 comprises a positive electrode lid attached at one end of an outer container, the positive electrode lid including a pressure plate effected as the innermost lid and electrically connected to a positive electrode of an electrode member through a positive electrode lead, a shield plate effected as an intermediate lid and electrically connected to the pressure plate through a central contacting portion, and a sealing plate affected as the outermost lid and electrically connected to the shield lid, wherein at least one gas flow hole is provided at the pressure plate so as to communicate the internal portion of the outer container with a contacting space between the pressure plate and the shield plate. A plurality of circular grooves are formed at a substantially central portion of the shield plate except for connecting tab portions which are coaxially notched and alternatively arranged with an angle of 180° so as to oppose the adjacent grooves of each other. The diameter of the grooves gradually increases from the inner side to the outer side and the pressure plate and the shield plate are isolated when the inner pressure level of the outer container exceeds a predetermined electric current isolation pressure.

A safety device as claimed in claim 3 comprises a positive electrode lid attached at one end of an outer container, the positive electrode lid including a pressure plate effected as the innermost lid and electrically connected to a positive electrode of a electrode member through a positive electrode lead, a shield plate effected as an intermediate lid and electrically connected to the pressure plate through a central contacting portion, and a sealing plate affected as the outermost lid and electrically connected to the shield lid, wherein at least one gas flow hole is provided at the pressure plate so as to communicate the internal space of said outer container with a contacting space between the pressure plate and the shield plate. The central contacting portion includes a protrusion protruded from a central portion of the pressure plate toward the shield plate and having a first flat contacting surface and a second contacting surface provided at a central portion of the shield plate and contacting with the first flat contacting surface of said protrusion, a plurality of circular grooves at a portion surrounding with the second flat contacting surface of the shield plate except for connecting tab portions which are coaxially notched and arranged alternatively with an angle of 180° so as to oppose the adjacent grooves of each other. The diameter of said grooves gradually increases from the inner side to the outer side. A valve layer is formed at each circular groove by adhering a metallic foil piece on a the side surface of said shield plate which abuts the pressure plate when the inner pressure level of the outer container exceeds a predetermined electric isolation pressure, the second flat contacting surface of the shield plate is released from the first flat contacting surface of the pressure plate so as to isolate an electric communication between the pressure plate and the shield plate. When the pressure level of the outer container exceeds a predetermined layer break pressure, each valve layer is broken. It is preferable that the shield plate and the metallic foil piece are made of a clad metal plate.

In the safety device, it is preferable that a circular shaped PTC thermister element be provided between the shield plate and the sealing plate.

Accordingly, in a normal condition, an electric communication between the pressure plate and the shield plate in a closed space is certainly maintained by contacting the first flat contacting surface provided on the protrusion of the pressure plate and the second flat contacting surface of the shield plate. On the other hand, when the inner pressure of the battery rises rapidly and exceeds a predetermined electric current isolation pressure, the shield plate, particularly the second flat contacting surface of the shield plate is released from the first flat contacting surface by producing cracked gas so as to isolate the electric communication between the pressure plate and the shield plate. Thus, the cracked gas can be prevented from increasing and being discharged to an exterior of the battery. In such a case, the second flat contacting surface is provided at a central portion of a plurality of circular grooves coaxially and alternatively arranged with an angle of 180, so that the second flat contacting surface can be released from the first contacting surface quickly. Thus, the electric communication between the pressure plate and the shield plate can be quickly isolated once the predetermined electric current isolation pressure has been reached. In such a case, the second flat contacting surface is plastically deformed so that the second flat contacting surface avoids contact with the first flat contacting surface again. If even numbers of circular grooves are formed, the second flat contacting surface can be removed from the first flat contacting surface while both surfaces are maintained a parallel to each other.

The electric isolation as described above is effected, if chemical reaction in the outer container proceeds and cracked gas is produced and the inner pressure rises further and exceeds a predetermined layer break pressure. Cracked gas can be discharged to the exterior of the battery through at least one gas flow hole formed at the pressure plate, the contacting space, at least one circular groove (valve layer) and at least one gas discharging hole by breaking the circular groove (valve layer) formed at the shield plate.

A shield plate may be made of a clad metal plate. A valve layer may be formed by a portion of the metallic foil piece for covering with an inner circular groove and an outer circular groove. The thickness of the metal plate is preferably about 50 um and the thickness of the metallic foil piece is preferably 10 I.L m.

For example, as disclosed in Japanese Patent Laid-Open Publication No. 1-224184 filed by the present inventors, such a clad metal plate is manufactured by a glow discharge method in which a grounded metallic substrate having a contacting surface and a grounded metallic foil piece are effected as one electrode A and the other electrode B supported by an insulator are applied with alternative current I to 50 MHz in inactive gas under extreme low pressure of $1\times10^{-1}$ to $1\times10^{4}$ Torr. The area of the electrode A exposed with plasma caused by the glow discharge is one third less than area of the electrode B and etched by a sputter etching method.

It is preferable that a circular shaped PTC thermister element is provided between a shield plate and a sealing plate. The PTC thermister element reduces electric current while the temperature of the closed battery increases so as to avoid an explosion caused by excess current.

BEST MODE FOR CARRYING OUT THE INVENTION

Embodiments according to the present invention will be described in detail with reference to accompanying drawings.

A structure of one embodiment of a safety device of a closed battery according to the present invention is explained with reference to FIG. 1 to FIG. 3.

Figure 1:
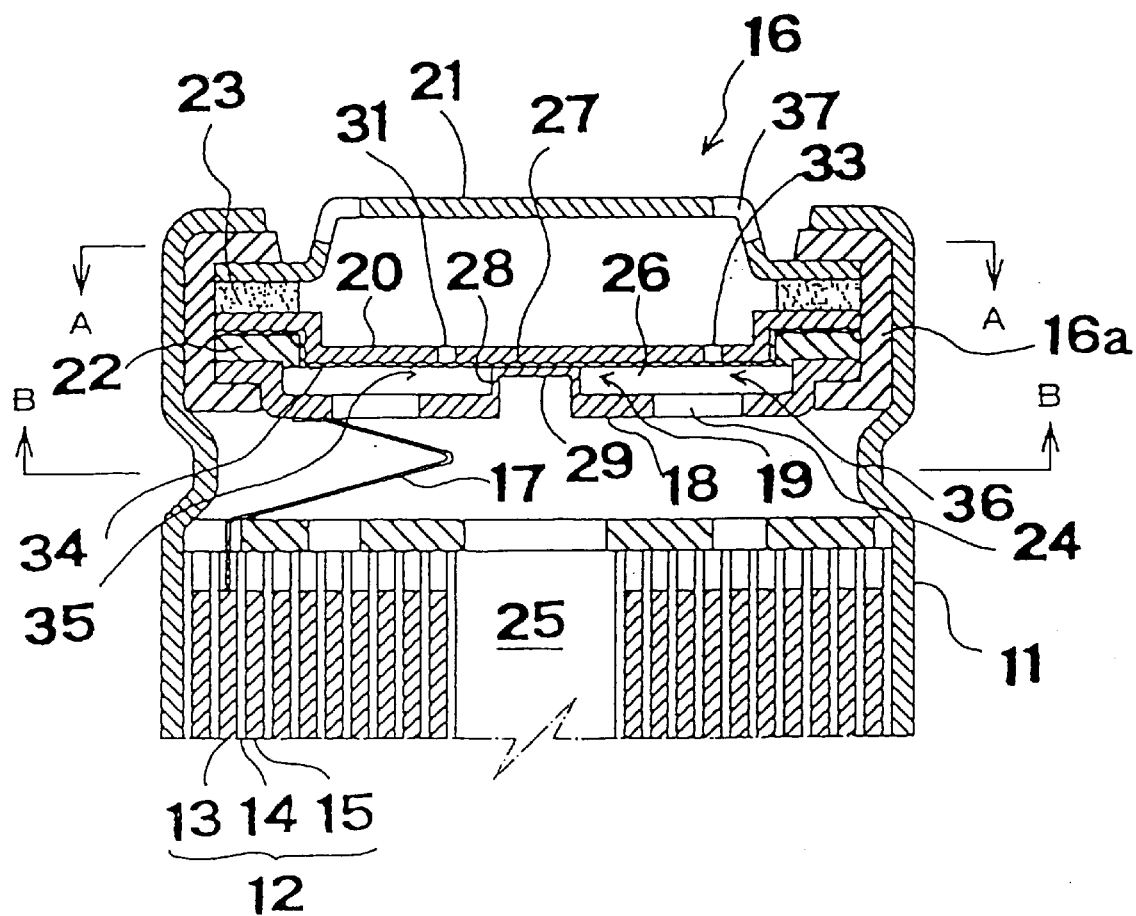
FIG. 1 shows a structure of one embodiment of a safety device of a closed battery according to the present invention in a normal operation condition.
Figure 2:
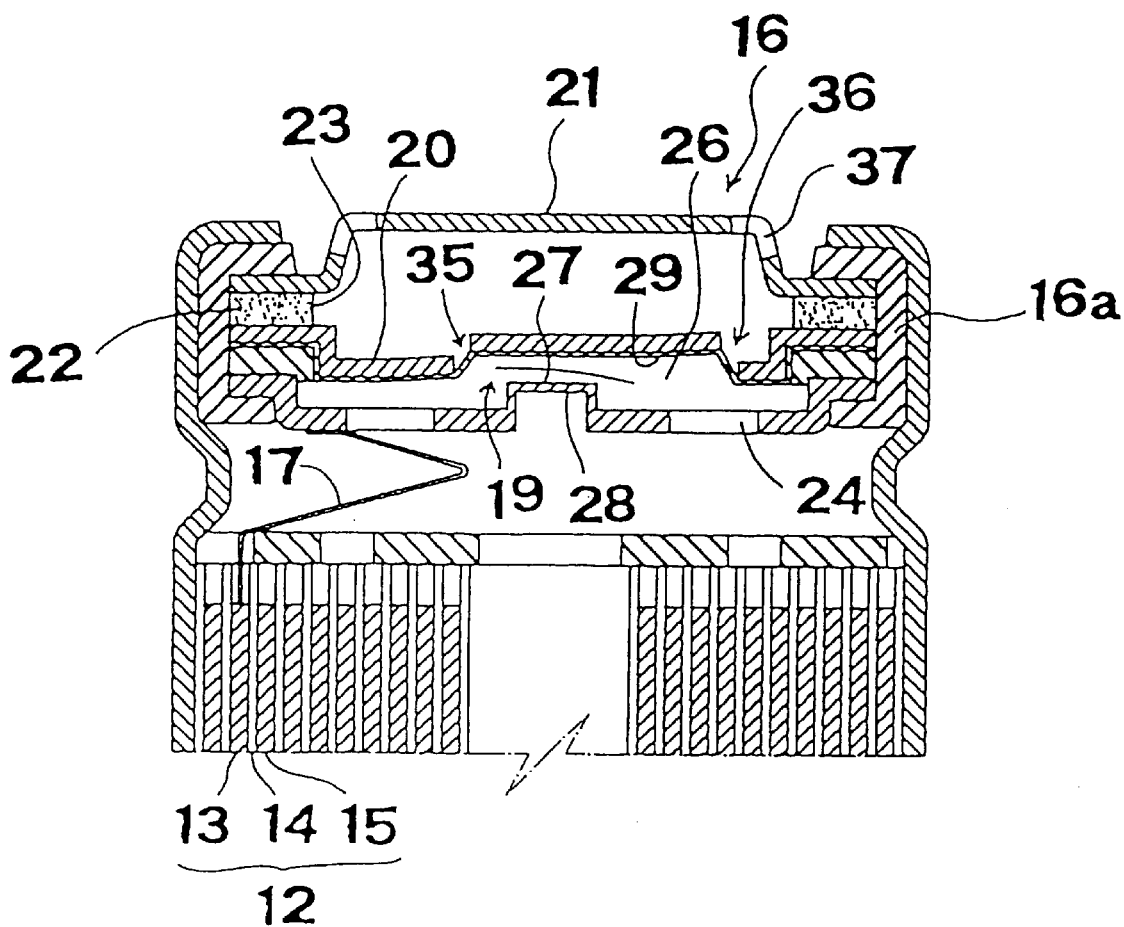
FIG. 2 shows a structure of the embodiment of the safety device of the closed battery according to the present invention in a condition in which a pressure plate and a shield plate are shut down in an electric communication.
Figure 3:
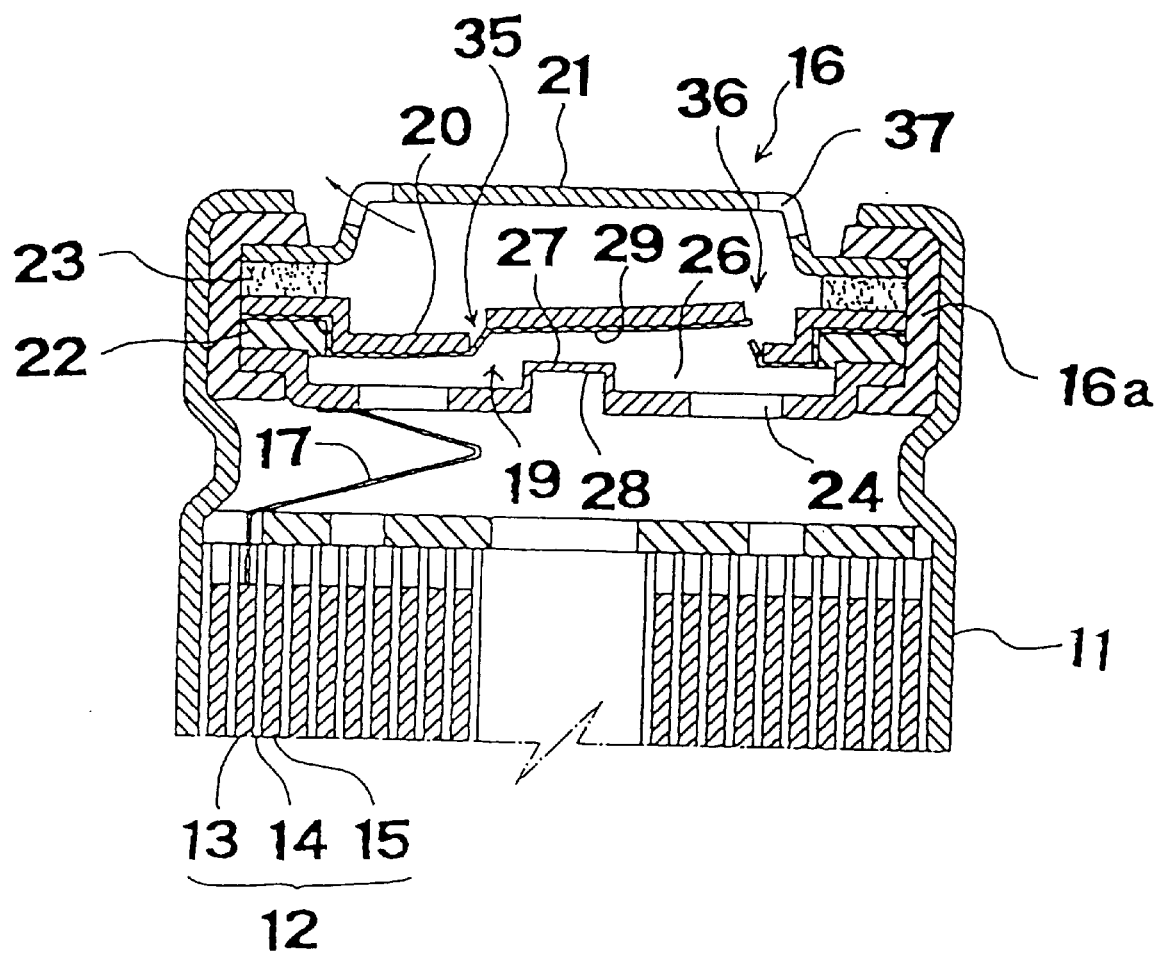
FIG. 3 shows a structure of the embodiment of the safety device of the closed battery according to the present invention in a condition in which the valve layer is broken.
Figure 4:
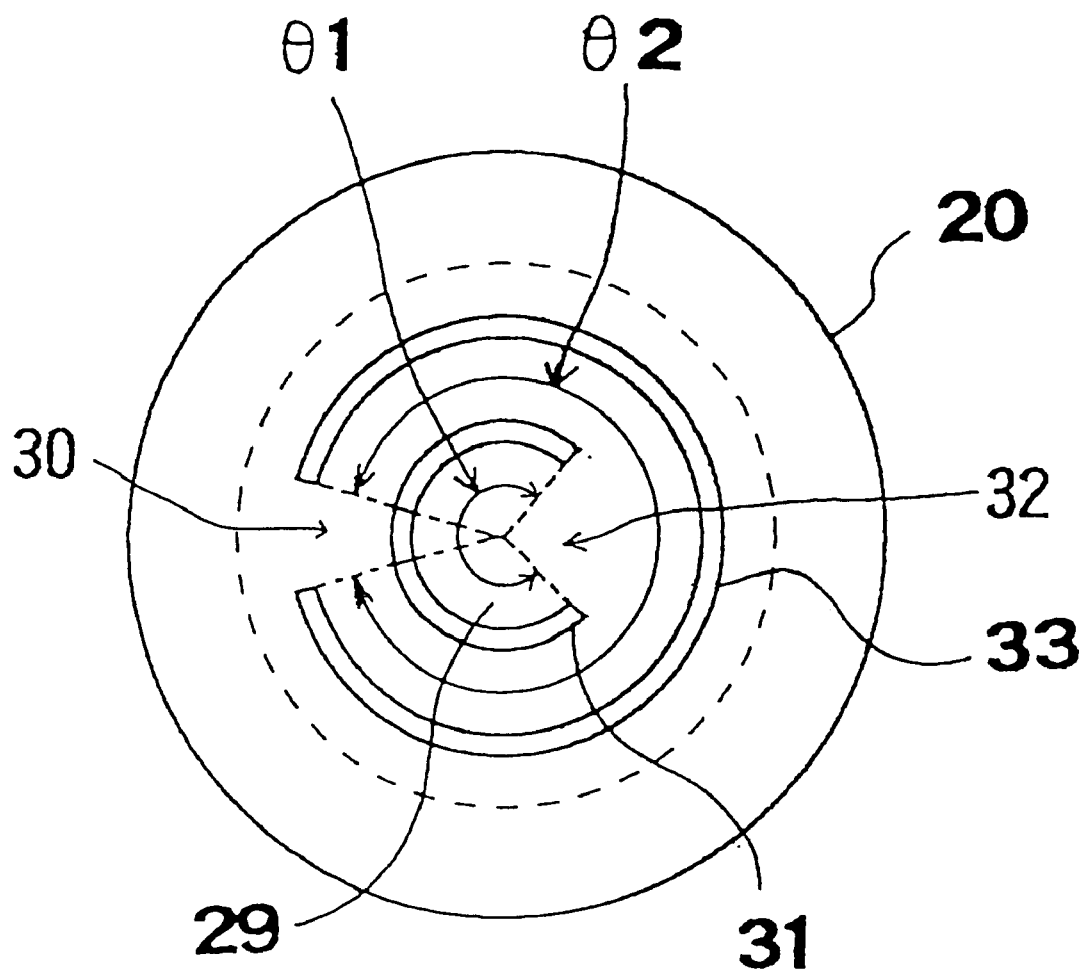
FIG. 4 shows a perspective view taken along a line B—B in FIG. 1.
Figure 5:
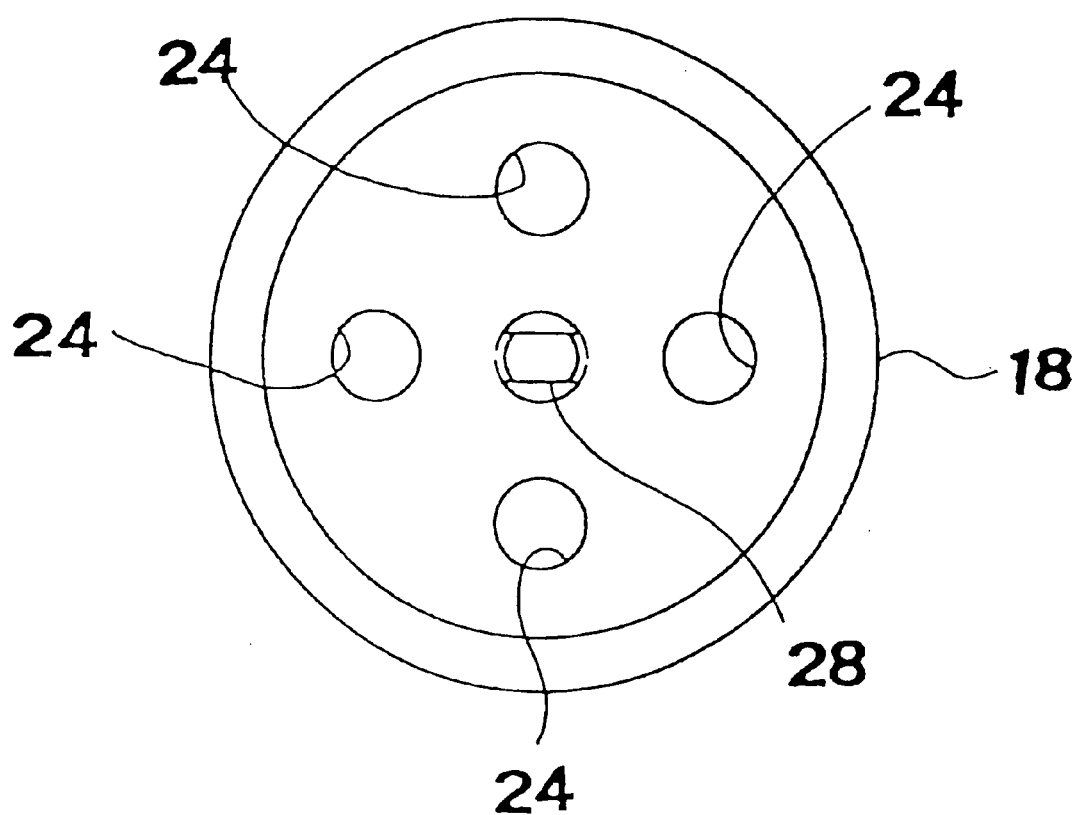
FIG. 5 shows a perspective view taken along a line A—A in FIG. 1.

As shown in FIG. 1 to FIG. 3, an electrode member 12 is installed in an outer container 11 used as a negative terminal. A positive electrode, a separator 14 and a negative electrode 15 are laminated as the electrode and drawn into a whirlpool. The safety device of a closed battery used both as an explosion-proof means and a terminal is provided at an upper opening portion of the outer container 11. The safety device is actually constituted by a positive electrode lid 16 caulked at the upper opening portion of the outer container 11 through an isolating gasket 16a.

As shown in FIG. 1 to FIG. 3, the positive electrode lid 16 comprises a pressure plate 18 which forms the innermost lid and is connected to the positive electrode 13 of the electrode member 12 through a positive electrode lead 17, a shield plate 20 which forms an intermediate lid and which is electrically connected to the pressure plate 18 through a central contact portion 19. A sealing plate 21 forms the outermost lid and is electrically connected to the shield plate 20. The positive electrode lid 16 comprises a circular isolating plate 22 sandwiched between the pressure plate 18 and the shield plate 20 and a circular PTC thermister element 23 sandwiched between the shield plate 20 and the sealing plate 21.

The structure of the positive electrode lid 16 as described above is explained.

As shown in FIG. 1 to FIG. 3 and FIG. 5, the pressure plate 18 has a plurality of gas flow holes 24. The internal chamber 25 of the outer container is connected to a contacting space 26 located between the pressure plate 18 and the shield plate 20 through the gas flow holes 24.

As shown in FIG. 1 to FIG. 3, the central contact portion 19 for electrically connecting with the pressure plate 18 and the shield plate 20 comprises a protrusion 28 having a first flat contact surface 27 and which protrudes from a central portion toward the shield plate 20. A second flat contact surface 29 located at the central portion of the shield plate 20 contacts the first flat surface of the protrusion 28.

As shown in FIG. 1 to FIG. 4, at a portion surrounding with second flat contact surface 29 of the shield plate 20, an inner circular groove 31 having a horse shoe shaped is formed except a portion for a first connecting tab portion 30. At a portion surrounding the portion with the inner circular groove 31, an outer circular groove 33 having a horse shoe shape of a larger diameter than that of the inner circular groove 31 is formed except for a portion of a second connecting tab 32 which opposes the first connecting tab 30 at 180°. Therein, it is preferable that an angle of circumference θ 1 of the inner circular groove 31 be smaller than an angle of circumference θ 2 of the outer circular groove 33. The angle θ 1 is preferably larger than an angle of the first connecting tab 30.

The horseshoe shaped inner circular groove 31 and outer circular groove 33 may be formed along the line of a circle line, the line of an oval, or lines of other undefined circles polygons.

In the embodiment according to the present invention, as shown in FIG. 1 to FIG. 3, a metallic foil piece 34 is attached to the surface of the shield plate 20 at a side confronting with the pressure plate 20. Valve layers 35 and 36 are formed at the inner circular groove 31 and the outer circular groove 32 covered with the metallic foil 34, respectively. The valve layers 35 and 36 are of a thickness such that the layers are broken when pressure more than predetermined rupture pressure (for example, 20 kg/cm$^2$) is applied to the valve layers 35 and 36. When a clad metal plate is formed by cladding a metallic foil piece 34 on the shield plate 20 made of an aluminum metal substrate with a thickness (i.e., 50 μm), a copper foil piece having a thickness of 10 μm may be used as the metallic foil 34.

In the present invention, the valve films for covering the inner circular groove and the outer circular groove with a metallic foil piece by adhering the metallic foil piece 34 on the surface of the shield plate 20 confronting with the plate pressure as described above are not essential. Instead of the inner circular groove 31 and the outer circular groove 32 penetrating into the shield plate 20, a notch having a V-shaped cross section may be formed at a part of the shield plate 20 by scoring along the thickness. When such a score is formed, adhering a metallic foil piece is unnecessary at the side of the shield plate 20 co nfronting pressure plate, since a groove having a thinner wall is provided.

Figure 6:
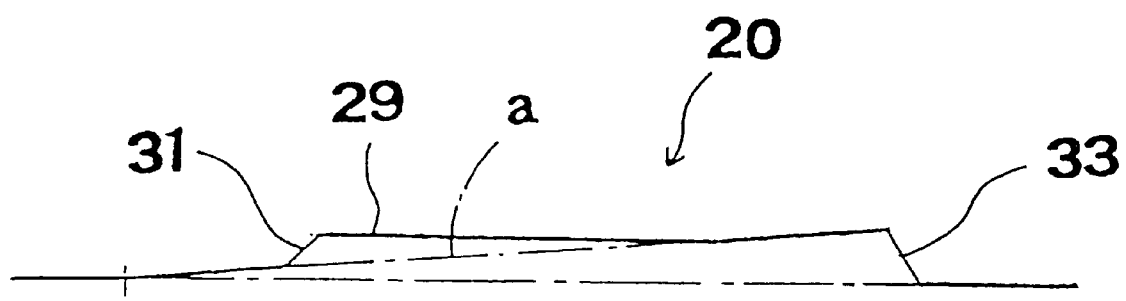
FIG. 6 shows a mechanism in which the first central contact portion of the pressure plate is released from the second central contacting portion of the shield plate in parallel.

In a relation between the central contacting portion 19 and the shield plate 20 as described above, when inner pressure is increased in the outer container 1 and exceeds a predetermined electric isolation pressure, while the valve film 36 is plastically deformed as shown in FIG. 3 and FIG. 6, a portion of the shield plate 20 inside of the outer circular groove 33 is wholly inclined along one direction so as to form an inclined surface a. The second flat surface 29 deforms the valve layer 35 by including along an opposite direction with respect to the inclined surface a simultaneously. As a result, the second flat contact surface 29 is released parallel to the first flat contacting surface 27 formed on the protrusion 28 of the pressure plate 18. When pressure of cracked gas reaches the predetermined electric isolation pressure, the shield plate 20 can be released from the pressure plate 18 by providing the inner and outer circle grooves 31 and 33. The second flat contacting surface 29 is released parallel to the first contacting surface 27. Even if a central portion of the shield plate 20 rises slightly, the shield plate 20 is completely released from the pressure plate 20. Thus, the electric contact between the pressure plate 18 and the shield plate 20 can be isolated quickly.

Figure 7:
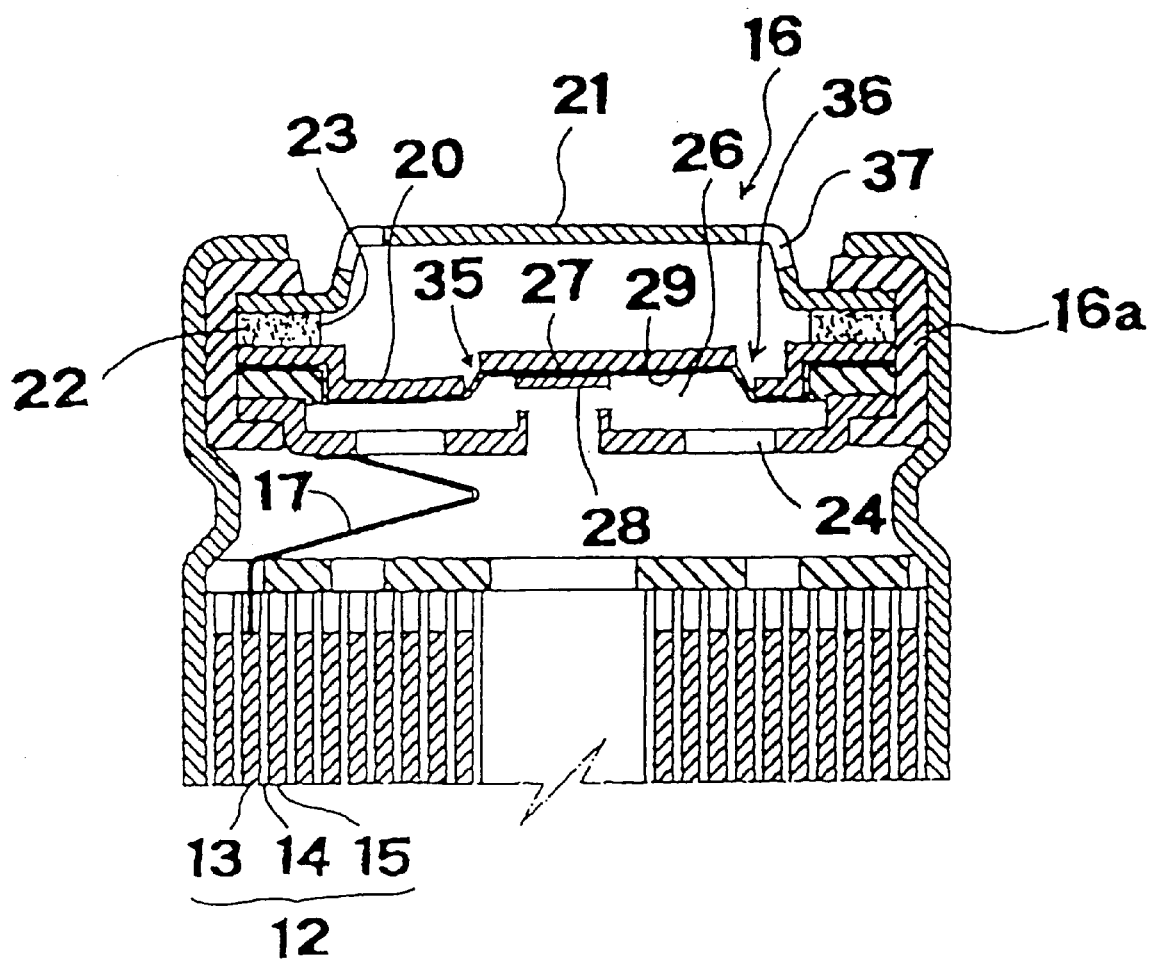
FIG. 7 shows a structure of another embodiment of a safety device of a closed battery according to the present invention in which a pressure plate and a shield plate are electrically isolated.
Figure 8:
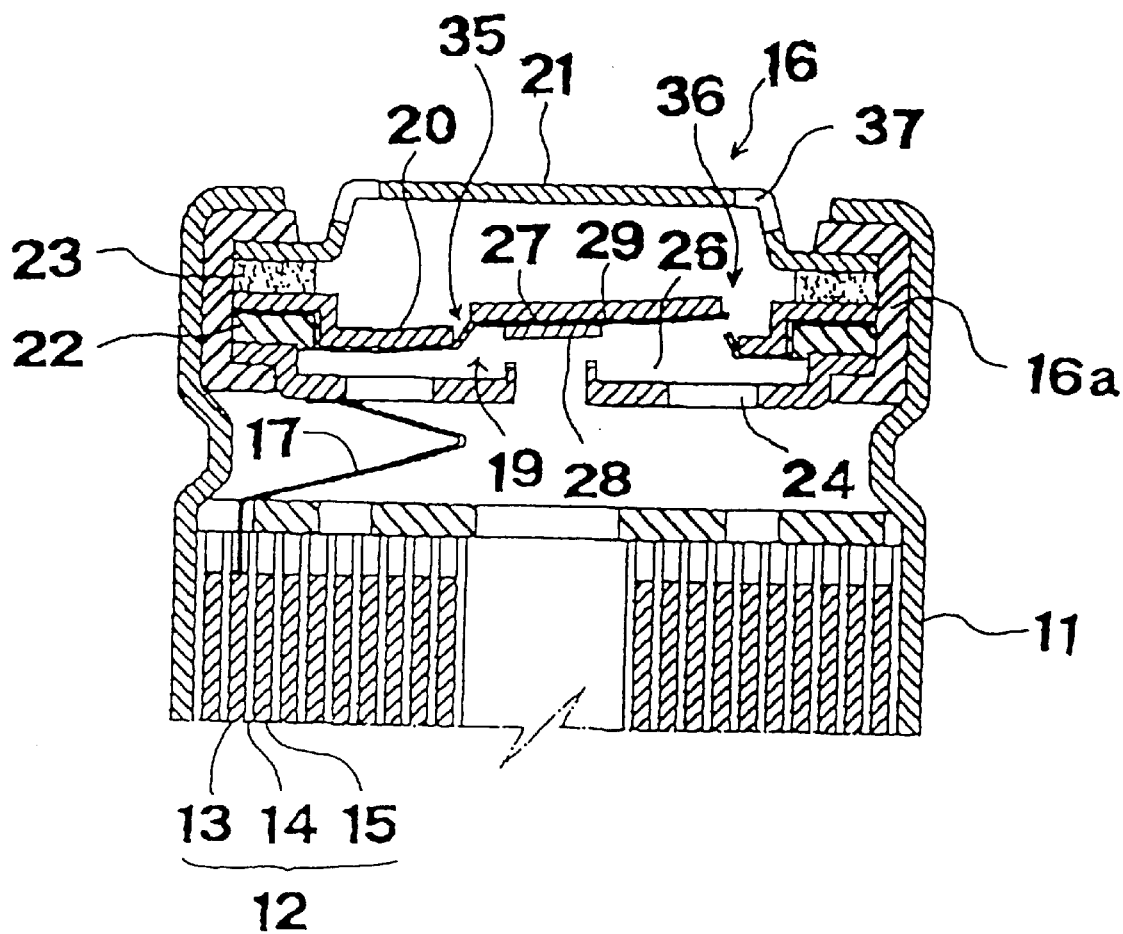
FIG. 8 shows a structure of another embodiment of the safety device of the closed battery according to the present invention in which the valve layer is broken.

FIG. 2 and FIG. 3 show a condition in which the electric communication is isolated by releasing the second flat contacting surface 29 and the first flat contacting surface 27, respectively. When the second flat contacting surface 29 and the first flat contacting surface 27 are adhered (for example, welded), a side surface of the protrusion 28 is torn so as to be broken as shown in FIGS. 7 and 8. In order to break the side surface of the protrusion 28, the wall thickness of the side surface of the protrusion 28 may be partly thinner so that the thinner wall thickness portion can be easily torn by the rising of the shield plate 20 so as to isolate the electric contact.

In the closed battery, if a large amount of electric current flows in an overcharge condition, highly corrosive cracked gas is produced in the outer container 11 and the pressure in the outer container 11 increases. While the condition is maintained, the closed battery would explode. However, in the embodiment, when the pressure of the cracked gas in the outer container 11 exceeds the predetermined electric isolation pressure, the cracked gas is introduced into the contacting space 26. Then, the second flat contacting surface 29 of the shield plate 20 is quickly released from the first flat contacting surface 27 formed on the protrusion 28 of the pressure plate 20 so as to isolate the electric communication between the pressure plate 18 and the shield plate 20. Accordingly, the system is prevented from providing more cracked gas so that an explosion of the outer container 11 caused by increasing the inner pressure of the outer container 11 can be avoided. In addition, the valve layer 35 and 36 have not been broken so that harmful crack gas is prevented from flowing to the exterior of the battery so that it does not contact a human body.

Even if the chemical reaction is still proceeding in the outer container 11, the inner pressure exceeds the predetermined layer breaking pressure by producing the cracked gas although the electric communication is isolated, one or both of the valve layers 35 and 26 would be broken as shown in FIG. 3 so that the cracked gas can be quickly discharged to the exterior from the contacting space 26 through a space between the shield plate 20 and the sealing plate 21 and the gas flow holes 37 so as to avoid exploding the closed battery.

As described above, the safety device of the closed battery according to the present invention accomplishes the electric isolation and discharging of cracked gas to the exterior of the battery so as to prevent the battery form exploding. The cracked gas is discharged to the exterior in an emergent case. Thus, danger to a human body and the environment can be controlled as much as possible.

As shown in FIG. 1 to FIG. 3, in the embodiment according to the present invention, the PTC thermister element 23 in a circular plate shape is provided between the shield plate 20 and the sealing plate 21 so that the thermister element 23 can act to lower electric current when a temperature of the safety device of the closed battery is increased by producing cracked gas. Thus, an explosion caused by excess current can be prevented.

In the embodiment according to the present invention as described above, although two circular grooves 31 and 33 are formed at a portion surrounding with the second flat contacting surface 29, there may be three and more grooves (without regard to even number or odd number).

POSSIBILITY OF USE IN THE INVENTION

As described above, in the safety device of the closed battery according to the present invention, when normal electric current flows, a closed battery can be operated normally by contacting a pressure plate and a shield plate in a sealed space in a pressure-tight condition. When an excess of current flows, a second flat contacting surface formed at a central portion of a plurality of circular grooves coaxially arranged is quickly released from a first flat contacting surface formed on a protrusion at a central portion of a pressure plate by utilizing pressure produced by cracked gas so as rapidly to isolate electric communication between the pressure plate and a shield plate rapidly. In addition, when the cracked gas is increased further, a valve layer is quickly broken so as to discharge the cracked gas. Thus, an electric isolation and discharging cracked gas to an exterior of the battery can be operated in order to avoid an explosion of the closed battery. The danger to a human body and to the environment can be controlled as less much as possible since a discharge of cracked gas to the exterior of the battery occur only in case of an emergency.

In the safety device of a closed battery according to the present invention, cladding a metallic foil piece on a metallic substrate on which inner- and outer-circular grooves are formed is provided so that a shield plate with a valve layer certainly actuated by the predetermined layer break pressure can be manufactured economically.

In addition, by providing a PTC thermister element in a circular shape between a shield plate and a sealing plate, the electric current is controlled to be reduced. Thereby, an explosion caused by excess current can be also prevented.

By providing a safety device for a closed battery according to the present invention, a safe closed battery with high performance can be manufactured economically.

What is claimed is:

1. A safety device for a closed battery comprising:
a positive electrode lid attached at one end of an outer container, said positive electrode lid including
a pressure plate forming the innennost lid adapted and constructed to be electrically connected to a positive electrode of an electrode member through a positive electrode lead;
a shield plate consisting of a clad metallic plate comprising an intermediate lid and which is electrically connected to said pressure plate through a central contacting portion; and
a sealing plate comprising the outermost lid and electrically connected to said shield plate;
wherein at least one gas flow hole is provided at said pressure plate so as to communicate an internal space of said outer container with a contacting space between said pressure plate and said shield plate,
said central contacting portion includes a protrusion protruded from a central portion of said pressure plate toward said shield plate and having a first flat contacting surface and a second contacting surface provided at a central portion of said shield plate and contacting with said first flat contacting surface of said protrusion, and
said pressure plate and said shield plate are isolated when an inner pressure level of said outer container exceeds a predetermined electric current isolation pressure.

2. A safety device for a closed battery comprising:
a positive electrode lid attached at one end of an outer container, said positive electrode lid including
a pressure plate comprising the innermost lid and electrically connected to a positive electrode of an electrode member through a positive electrode lead;
a shield plate comprising an intermediate lid and electrically connected to said pressure plate through a central contacting portion; and
a sealing plate comprising the outermost lid and electrically connected to said shield lid;
wherein at lest least one gas flow hole is provided at said pressure plate so as to communicate an internal portion of said outer container with a contacting space between said pressure plate and said shield plate;
a plurality of circular grooves are formed at a substantially central portion of said shield plate except for connecting tab portions coaxially notched and alternatively arranged with an angle of 180° so as to oppose the adjacent grooves each other; wherein the diameter of said grooves gradually increases from an central portion to a peripheral portion and
said pressure plate and said shield plate are isolated when the inner pressure level of said outer container exceeds a predetermined electric current isolation pressure.

3. A safety device for a closed battery comprising:
a positive electrode lid attached at one end of an outer container, said positive electrode lid including
a pressure plate comprising the innermost lid and electrically connected to a positive electrode of a electrode member through a positive electrode lead;
a shield plate comprising an intermediate lid and electrically connected to said pressure plate through a central contacting portion; and
a sealing plate comprising the outermost lid and electrically connected to said shield lid;
wherein at least one gas flow hole is provided at said pressure plate so as to communicate an internal space of said outer container with a contacting space between said pressure plate and said shield plate;
said central contacting portion includes a protrusion protruded from a central portion of said pressure plate toward said shield plate and having a first flat contacting surface and a second contacting surface provided at a central portion of said shield plate and contacting with said first flat contacting surface of said protrusion,
a plurality of circular grooves at a portion surrounding said second flat contacting surface of said shield plate except for connecting tab portions coaxially notched and arranged alternatively with an angle of 180° so as to oppose the adjacent grooves of each other, the diameter of said grooves gradually increases from a central portion to a peripheral portion, and a valve layer is formed at each said circular groove by adhering a metallic foil piece on a side surface of said shield plate confronting with said pressure plate; and when the inner pressure level of said outer container exceeds a predetermined electric isolation pressure, said second flat contacting surface of said shield plate is released from said first flat contacting surface of said pressure plate so as to isolate an electric communication between said pressure plate and said shield plate and, when said pressure level of said outer container exceeds a predetermined layer break pressure, each said valve layer is broken.

4. The safety device for a closed battery as claimed in claim 3, wherein said shield plate and said metallic foil piece are formed by clad metallic plates.

5. A closed battery comprising the safety device of claim 1.

6. A closed battery comprising the safety device of claim 2.

7. A closed battery comprising the safety device of claim 3.

8. A closed battery comprising the safety device of claim 4.

9. A safety device for a closed battery according to claim 1 wherein a PTC thermistor element having a circular shape is provided between the shield plate and the sealing plate.

10. A safety device for a closed battery according to claim 2 wherein a PTC thermistor element having a circular shape is provided between the shield plate and the sealing plate.

11. A safety device for a closed battery according to claim 3 wherein a PTC thermistor element having a circular shape is provided between the shield plate and the sealing plate.

12. A safety device for a closed battery according to claim 4 wherein a PTC thermistor element having a circular shape is provided between the shield plate and the sealing plate.

13. A closed battery comprising the safety device of claim 9.

14. A closed batter comprising the safety device of claim 10.

15. A closed battery comprising the safety device of claim 11.

16. A closed battery comprising the safety device of claim 12.

* * * * *